Sept. 22, 1964      R. C. PRICE      3,150,368

PULSE COMPRESSION RESIDUE BLANKING

Filed March 25, 1963

INVENTOR.
Richard C. Price,
BY
H. H. Losch
Att'ys.

United States Patent Office 3,150,368
Patented Sept. 22, 1964

3,150,368
PULSE COMPRESSION RESIDUE BLANKING
Richard C. Price, Westbury, N.Y., assignor, by mesne assignments, to the United States of America as represented by the Secretary of the Navy
Filed Mar. 25, 1963, Ser. No. 267,874
6 Claims. (Cl. 343—17.2)

This invention relates to a pulse compressed radar receiver circuit and more particularly to a two-channel pulse compression and detection circuit constructed and arranged to subtract partially compressed echo signals of one channel from compressed echo signals of the other channel to blank out residue signals.

In known pulse compression radar receivers each incoming radar echo signal consists of a long pulse of microwave frequency having instantaneous frequency that varies within the pulse in some known manner, such as being swept from some high frequency at the beginning of the pulse to some lower frequency at the end of the pulse. This incoming echo signal is received by the antenna and mixed with a local oscillator signal to produce a signal at the intermediate frequency. This signal is then amplified by a preamplifier and sent to a pulse compression filter. This filter delays each frequency within the pulse in such a manner that the beginning of the pulse and all other portions of the pulse are made coincident with the end of the pulse. This produces a very short pulse at the output of the filter. This compressed pulse is accompanied by smaller pulses on each side in the envelope typically in the form of a $$\frac{\sin X}{X}$$

curve, these smaller pulses being termed the residue. These residue pulses are similar to the side lobes that accompany an antenna beam. These residue signals can produce false signal indications and, accordingly, it is desirable to eliminate and blank out these residue signals from the true echo signal.

In the present invention a second pulse compression channel, including an intermediate frequency amplifier and a detector, is placed in parallel to the principal pulse compression filter channel. The second channel can have either a pulse compression filter to provide partial pulse compression, or partial pulse compression can be obtained from the pulse compression filter in the principal channel by tapping into the plurality of filters making up the pulse compression filter in the principal channel. In either construction the second channel is to provide only partial pulse compression of the echo pulses and these partially compressed echo pulses are subtracted from the fully compressed echo pulses in a subtractor circuit to pass only the high amplitude compressed echo signals free of residue. The subtractor circuit output is rectified in a rectifier circuit and from thence is coupled to the output circuit of the radar for use in target evaluation, ranging, etc. It is therefore a general object of this invention to provide a pulse compression radar receiver with residue blanking circuitry to provide pulse compressed echo target signals free of residue.

These and other objects and the attendant advantages, features, and uses will become more apparent to those skilled in the art as the description proceeds when considered along with the accompanying drawing, in which.

Figure 1:
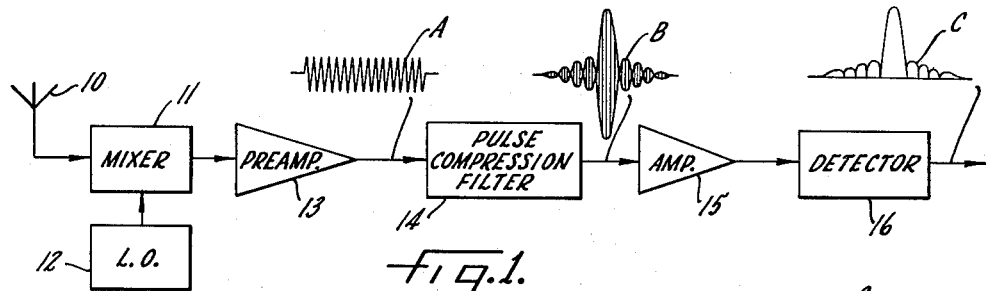
FIGURE 1 is a block circuit schematic diagram of a simplified pulse compression radar receiver system.

Referring more particularly to FIGURE 1, there is illustrated a very simplified block circuit diagram of a pulse compression radar receiver system, a more complete system being illustrated in the United States Patent 2,624,876, of R. H. Dicke which issued on January 6, 1953. In FIGURE 1, the output of a radar antenna 10 is coupled to a mixer 11 to which is also applied the oscillations of a local oscillator 12. Intermediate frequency is produced on the output of mixer 11 which intermediate frequency is preamplified in a preamplifier 13 to produce amplified intermediate frequency as shown by the wave form representation A. The intermediate frequency from preamplifier 13 is pulse compressed in a pulse compression filter circuit 14 of any well-known pulse compression filter circuit design and the output amplified in the intermediate frequency amplifier 15. The output of the pulse compression filter circuit 14 produces a compressed signal with side lobes as illustrated in the wave envelope B and it has been found that this compressed signal very closely resembles the $$\frac{\sin X}{X}$$

wave envelope. The production of pulse compressed signals for pulse compression radar producing the wave form B is more fully explained in the article of Charles E. Cook, entitled "Pulse Compression—Key to More Efficient Radar Transmission" in the Proceedings of the IRE, vol. 48, No. 3, March 1960, beginning on page 310. The article of Cook also shows and describes one type of bridged-T all-pass pulse compression filter network. The amplified pulse B is detected in a detector circuit 16 to produce on the output a detected and compressed echo signal C, as shown, for use in the radar circuitry to evaluate the target, such as for ranging, locating, and identifying targets. As may be seen in the compressed wave envelope C, side lobes appear which are herein referred to as residue. These residue signals appear on both sides of the compressed pulse usually at a magnitude of 24 decibels or less from the peak of the compressed pulse. Since the dynamic range of modified radars exceed 100 decibels, it is apparent that a strong return signal will produce detectible residues. These residue signals can sometimes cause false signal indications in pulse compression radar which are, of course, objectionable in the proper operation of the radar system.

Figure 2:
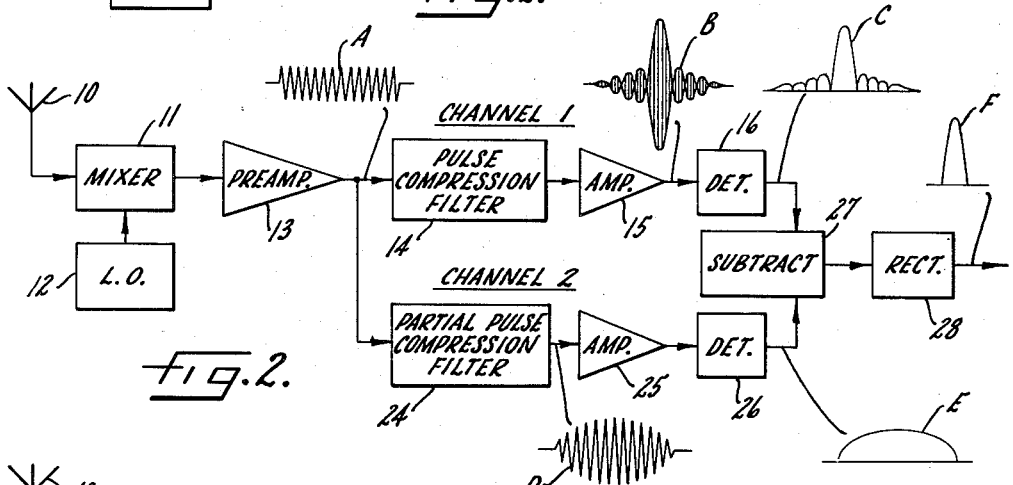
FIGURE 2 is a block circuit schematic diagram of a pulse compression residue blanking radar system in accordance with this invention.
Figure 4:
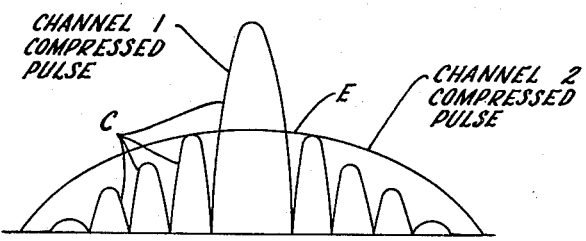
FIGURE 4 is a pulse envelope representation of the outputs of the two pulse compression channels of FIGURES 2 and 3.

Referring more particularly to FIGURE 2, it is to be noted that like parts with those of FIGURE 1 are represented by like reference characters in this figure, channel 1 containing like parts with the single channel pulse compression radar system of FIGURE 1. In accordance with this invention, a second receiver pulse compression filter channel 2 is placed in parallel with the pulse compression filter channel 1. In channel 2 a partial pulse compression filter 24 is coupled to receive the output of the preamplifier 13. The partial pulse compression filter 24 filters the target signal A a lesser amount than the pulse compression filter 14 to produce the partially compressed pulse as shown by D on the output of the partial pulse compression filter 24. The output of the filter 24 is amplified in the intermediate frequency amplifier 25 and detected in the detector circuit 26 to produce on the output thereof the amplified and detected partially compressed pulse illustrated by the envelope E. The outputs of the detectors 16 and 26 are coupled as inputs to a subtractor circuit 27 which subtractor circuit is constructed and arranged to apply the compressed pulse C as a minuend and the partially compressed pulse E as the subtrahend. The application of these two signals to the subtractor circuit 27 is more clearly illustrated in FIGURE 4 wherein the detected and compressed signal C of channel 1 and the partially compressed and detected signal E from channel 2 are shown greatly enlarged and superimposed as they would be for subtraction. As may be seen in FIGURE 4, the signal E is subtracted from signal C thereby revealing only the upper portion of the compressed signal C in the output of the subtractor circuit 27. The upper portion of signal C is rectified in the output circuit rectifier 28 to produce in the output thereof an echo pulse of the target object signal free of all residue. The amplifiers 15 and 25 may be lin-log amplifiers without changing the basic operation of this invention. When such lin-logged devices are employed, the described invention constitutes a perfect automatic gain control system as the output system remains constant for all levels of input signals exceeding a given threshold. When the amount of compression in the pulse compression filter 14 and the partial pulse compression filter 24 and the amount of amplification in the intermediate frequency amplifiers 15 and 25 are properly chosen, the subtractor circuit will subtract partially compressed signals E from the fully compressed pulses C as shown in FIGURE 4 and the remaining portion of the compressed pulse C will contain only the compressed pulse as shown by F in FIGURE 2.

Figure 3:
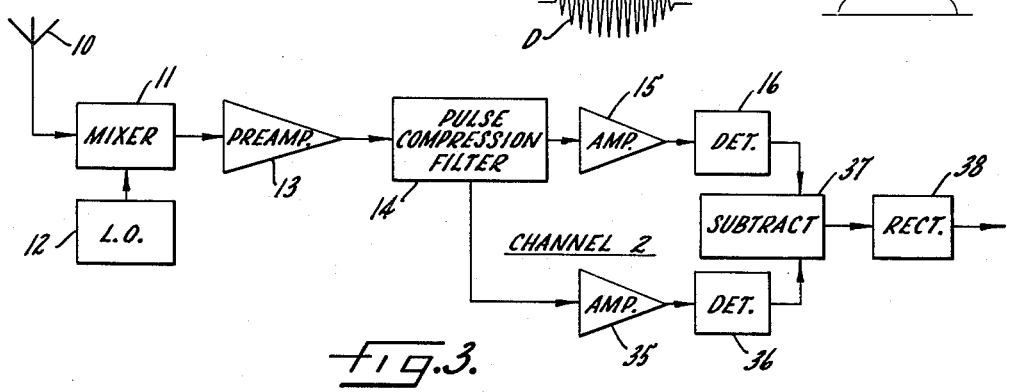
FIGURE 3 is a block circuit schematic diagram of a modification of the pulse compression residue blanking radar system as shown in FIGURE 2.

This invention can also be carried out with equal facility, as shown in FIGURE 3, where like parts are identified by like reference characters with those in FIGURES 1 and 2. In this modification, the pulse compression filter 24 is eliminated from channel 2 and the intermediate frequency target echo signal A is acquired as a partially compressed pulse identical to that of pulse D in FIGURE 2 by tapping into the pulse compression filter 14 at a point prior to full pulse compression. This tapped portion from the pulse compression filter 14 is applied through an intermediate frequency amplifier 35 and a detector 36 in channel 2 in the same manner as described for these components in FIGURE 2. Subtraction and rectification take place in the subtractor circuit 37 and the receiver circuit 38 in FIGURE 3 in the same manner and with the same results as shown and described for FIGURE 2. Accordingly, the output of detector 16 produces the compressed signal C with residue as shown in FIGURE 2 and the detector output 36 produces the detected partially compressed signal such as E shown in FIGURE 2 which, when subtracted and rectified in the subtractor circuit 37 and the rectifier circuit 38, produce the pulse compressed target echo signal F of FIGURE 2 on the rectifier 38 output.

The operation of the two embodiments shown in FIGURES 2 and 3 are believed to be clear and obvious from the description of these figures. Target echoes are received at the antenna 10 and changed to intermediate frequency signal from the output of the mixer 11 and preamplifier 13 to produce the intermediate target echo signals and partially compressed target echo signals in the first and second detector channels as shown in both FIGURES 2 and 3. Each partially compressed target echo signal coming from channel 2 will be subtracted from each companion fully compressed target echo signal coming from channel 1 in the subtractor circuit. This operation will subtract from the fully compressed target echo signal C all of the residue signals under the line E corresponding to the partially compressed target signal coming from channel 2 of the receiver. This operation will blank all residue signals and will allow the high amplitude pulse compressed signal F to pass to the output of the rectifiers 28 or 38 free of residue whereby no false signals can be used in the radar evaluation of the target. The degree of pulse compression and partial pulse compression can be controlled by the pulse compression filter or the amplitude control of the intermediate frequency amplifiers. Accordingly only pure pulse compressed target echo signals are readily identifiable by radar target evaluation.

While many modifications and changes may be made in the constructional details of the simplified circuit schematics of the radar system shown and described by the two modifications herein, such as applying pulse compression residue blanking to the radio frequency circuits in place of the intermediate frequency circuits as shown, it is to be understood that I desire to be limited by the spirit and scope of this invention only by the scope of the appended claims.

I claim:
1. A pulse compression residue blanking circuit for pulse compression radar comprising:
   a radar receiver having a mixer receiving radar signals and local oscillations from an antenna and a local oscillator, respectively, for production of intermediate frequency echo signals;
   a pulse compression filter circuit means coupled to receive said intermediate frequency echo signals to produce compression and partial compression of said echo signals on two outputs thereof;
   a detector coupled to each said output of said pulse compression filter means to produce detected outputs of said compressed echo signals and partially compressed echo signals; and
   a subtractor circuit coupled to receive and subtract said partially compressed echo signals from said compressed echo signals on an output thereof whereby residue signals falling within the partially compressed echo signal amplitude are blanked in said subtractor circuit from said target signals.

2. A pulse compression residue blanking circuit for pulse compression radar comprising:
   a mixer coupled to receive radar echo signals and local oscillator signals to produce intermediate frequency echo signals;
   pulse compression filter means coupled to the output of said mixer and having two outputs providing pulse compression on one output and partial pulse compression on the other output of said intermediate frequency echo signals;
   a detector circuit coupled to each pulse compression filter means output producing detection of said pulse compressed and partial pulse compressed signals on respective outputs thereof;
   a subtractor circuit coupled to receive said pulse compressed signal as a minuend and to receive said partial pulse compressed signal as a subtrahend to produce a signal difference on an output thereof; and
   a rectifier coupled to said subtractor circuit to produce monovoltage target echo signals on an output thereof free of residue signals.

3. A pulse compression residue blanking circuit as set forth in claim 2 wherein
   said pulse compression filter means consists of two pulse compression filters, one of which provides the output of pulse compression and the other of which provides the output for partial pulse compression.

4. A pulse compression residue blanking circuit for pulse comparison radar comprising:
   a mixer coupled to receive radar echo signals and local oscillator signals to produce intermediate frequency echo signals;
   pulse compression filter means coupled to the output of said mixer and having two outputs providing pulse compression and partial pulse compression of said intermediate frequency echo signals;
   an intermediate frequency amplifier coupled to each pulse compression filter means output to amplify each output of the pulse compression filter means;
   a detector coupled to each amplifier to provide detected echo signals on the outputs thereof; and
   a subtractor circuit coupled to said detectors to subtract the partially compressed detected pulse echo signals from the compressed pulse detected echo signals on an output thereof whereby residue signals are blanked out of said echo signals.

5. A pulse compression residue blanking circuit as set forth in claim 4 wherein said pulse compression filter means consists of two pulse compression filters, one of which provides said partial pulse compression with respect to the other.

6. A pulse compression residue blanking circuit for a pulse compression radar receiver channel having a mixer, a preamplifier, a pulse compression filter, an intermediate frequency amplifier, and a detector, in that order from a radar antenna to an output circuit for receiving radar target echo signals, for converting them to intermediate frequency signals, for compressing them into high amplitude signals of short duration including residue side bands, and for detecting said signals for use in the output circuit, the invention which comprises:

a second receiver channel including a second intermediate frequency amplifier and a second detector coupled to said pulse compression filter at a point therein to produce partial pulse compression of said echo signals;

a subtractor circuit coupled to receive said echo signals from said receiver channel detector and said second receiver channel detector to subtract said partially compressed echo signals from said compressed echo signals blanking said residue side band signals and passing said high amplitude echo signals to an output thereof; and a rectifier coupled between said subtractor output and said output circuit to rectify said high amplitude echo signals whereby only the compressed pulse echo signals free of residue are used.

References Cited in the file of this patent

UNITED STATES PATENTS 3,105,967    Cook ------------------ Oct. 1, 1963